United States Patent Office 3,515,218
Patented June 2, 1970

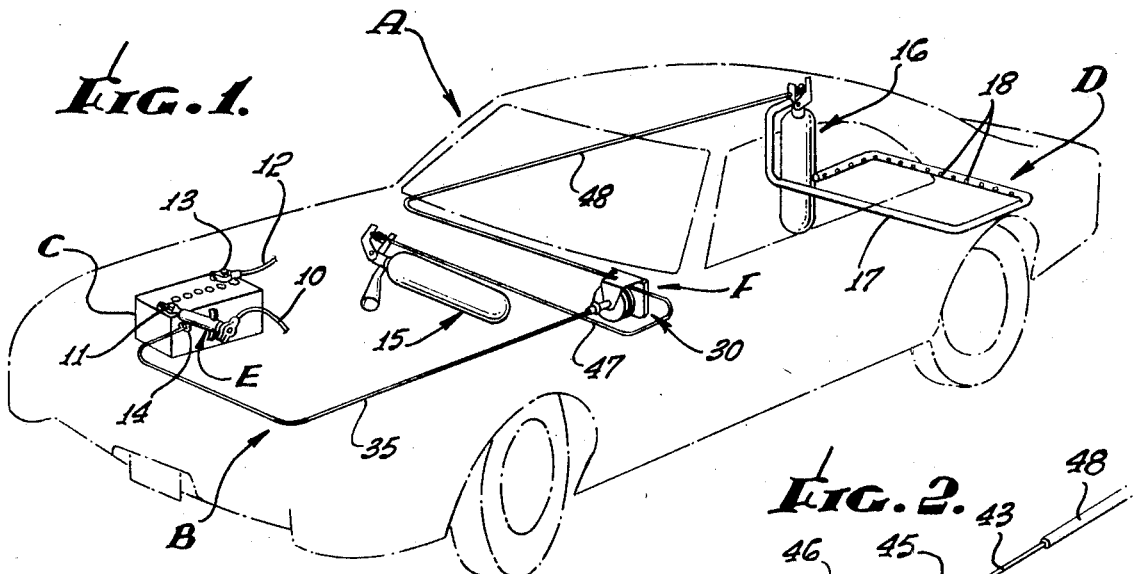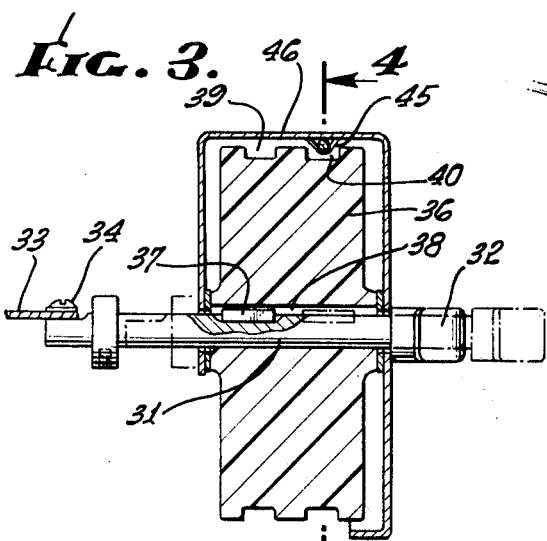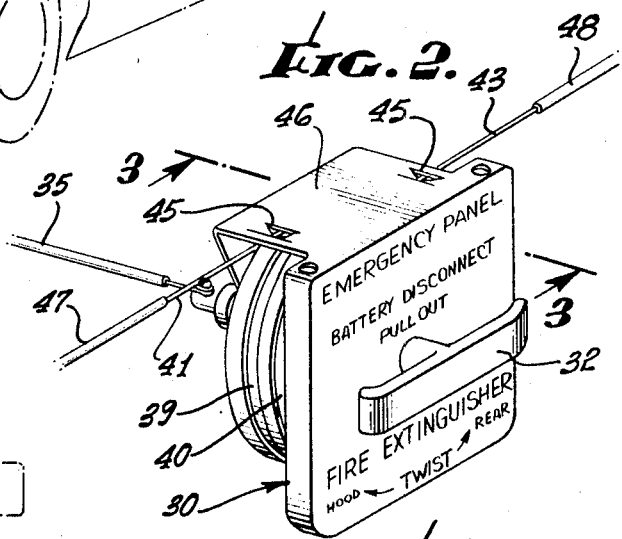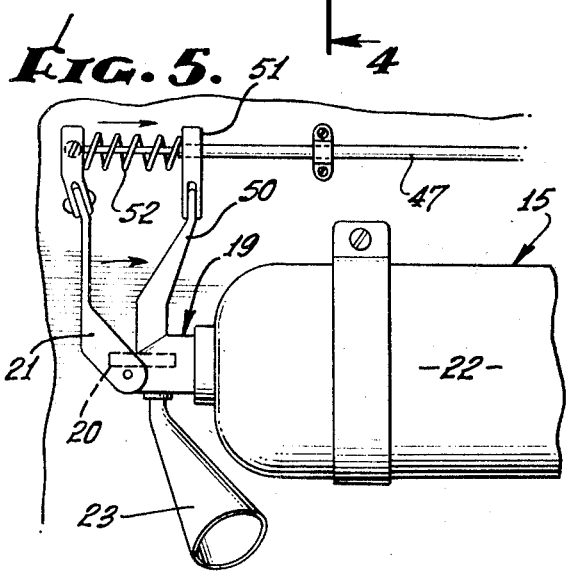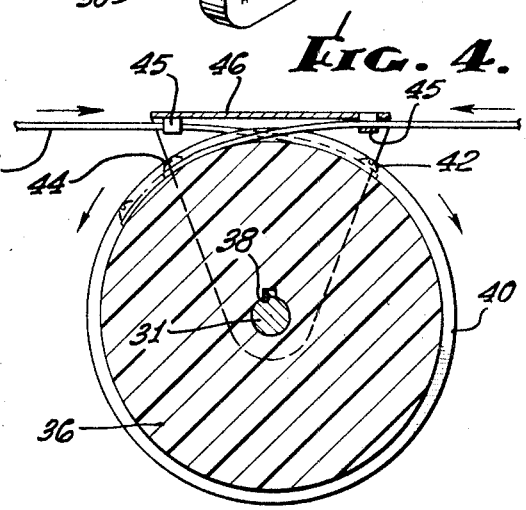

---

3,515,218
FIRE SAFETY SYSTEM
Newell J. Gardner, 6505 Wilshire Blvd., Los Angeles, Calif. 90048, and William R. Lastinger, Austin, Tex. (P.O. Box 75366, Los Angeles, Calif. 90005)
Filed Mar. 11, 1968, Ser. No. 714,166
(Filed under Rule 47(a) and 35 U.S.C. 116)
Int. Cl. A62c *3/00*
U.S. Cl. 169—2                                    7 Claims

---

ABSTRACT OF THE DISCLOSURE

A system for preventing or extinguishing automotive vehicle fires, a single actuator being located on the automobile dash and being selectively operable to open the main automobile battery circuit, operate an extinguisher under the automobile hood to flood the engine compartment with a fluent fire fighting medium, or to operate an extinguisher in the region of the fuel tank to cover such region with a fluent fire fighting medium.

---

The present invention relates to a safety system for automotive vehicles, and more particularly to apparatus for preventing or extinguishing hazardous conditions in various regions of the vehicles.

Fires oftentimes are initiated in the vicinity of an automobile engine as a result of sparks and the like emanating from the electrical system of a vehicle. The fire may be extinguished, but the electrical system has remained active and capable of restarting the conflagration. In applicants' application, Ser. No. 688,456, filed Dec. 6, 1967, for "Quick Disconnect Battery Apparatus," it has been proposed to provide an apparatus which effectively disconnects one of the battery cables from a battery post, this disconnection being controlled from a remote point, such as from the dash of the automobile engine compartment.

It has also been proposed to provide an apparatus for extinguishing fires under an automobile hood and other locations of the motor vehicle, the fire extinguishing equipment being under the control of the vehicle operator. Exemplifying the prior art on this subject are U.S. Pat. Nos. 1,493,327, 1,744,733, 2,316,789, 2,511,959, 2,596,761, 2,867,281 and 3,245,473. However, the prior art devices are relatively complex and cannot be selectively operated by the operator of the motor vehicle, and particularly very quickly from the driver's compartment.

By virtue of the present invention, a single control member can be selectively actuated for the purpose of opening the automobile battery circuit and thereby preventing electrical sparks and the like from being produced capable of initiating a fire, or to operate extinguisher devices mounted at desired locations in the vehicle. Relatively simple portions of the equipment readily available on the open market are useable as fire extinguishing devices, thereby reducing the cost of the entire installation. Such fire extinguishing devices can be placed at one or a plurality of locations in or externally of the vehicle, depending upon the regions where fire and other difficulties are likely to occur. Simple manipulations of a single control mechanism can selectively and effectively disconnect the battery or operate one or more fire fighting devices, as desired. Only a single unit can be actuated, or a plurality of units can be actuated, all within ready reach of the operator, who is usually in the driver's compartment of the motor vehicle. The simplicity of the single control and its location on the dash or other convenient place within the driver's compartment makes actuation of the various mechanisms forming part of the system occur extremely rapidly before a fire can start, or, if it does start, before it can spread to a dangerous degree.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIG. 1 is an isometric view disclosing the system in connection with a passenger automobile;

FIG. 2 is an isometric view of the control unit which may be mounted on the dash of the vehicle;

FIG. 3 is a section taken generally along the line 3—3 on FIG. 2;

FIG. 4 is a section taken along the line 4—4 on FIG. 3;

FIG. 5 is a view of a portion of one of the fire extinguishers and its associated operating mechanism.

As disclosed in FIG. 1, an automobile vehicle A has the usual engine compartment B at its forward portion covered by the hood of the vehicle, a battery C being located under the hood for supplying the necessary current for operation of the vehicle. The latter also has a fuel tank, such as a gasoline tank, located typically at the rear portion D of the vehicle. The present system includes a battery disconnect unit E for electrically disconnecting one of the battery cables 10 from its associated battery post 11. The other battery cable 12 may remain clamped to its battery post 13, since disconnection of only one cable is sufficient to render the entire electric circuitry of the vehicle inoperative. The battery disconnect unit E is illustrated, described and claimed in applicant's above-identified application Ser. No. 688,456, which supplies all of its specific details. However, the battery disconnect unit can assume various forms, so long as it is readily disconnectible from a remote source, such as the dash F of the automotive vehicle. In this connection, a pin 14 is pulled from the battery disconnect unit by appropriate manipulation of a control device mounted on the dash, which will cause the unit E to automatically disconnect the cable 10 from the battery post 11.

Disposed at one or more convenient locations in the automobile vehicle are fire extinguishers 15, 16 which can take any suitable form or forms. Thus, a fire extinguisher 15, which may be of the carbon dioxide type, is suitably mounted under the hood of the vehicle in the engine compartment. Another fire extinguisher 16, which may be of any suitable type, such as of the foam type, is suitably secured to a portion of the vehicle in the region of its fuel tank (not shown). The fluent fire extinguishing medium, such as foam, will flow through tubing 17 leading from the extinguisher and which may surround the fuel or gasoline tank, there being a plurality of perforations 18 along the length of the tubing through which the fire fighting foam, or the like, can eject for the purpose of completely surrounding the fuel tank with the fire extinguishing fluid.

The outlet portion of a typical fire extinguisher is disclosed, by way of example only, in FIG. 5. It includes a valve 19 operated by a valve plunger 20. A lever 21 is suitably pivoted on the valve housing, and when moved toward the tank 22 of the fire extinguisher shifts the plunger 20 inwardly to open the valve; whereupon the fluent medium for fighting the fire, or for preventing the fire, will discharge through the nozzle or horn 23 into the particular region to be protected.

The battery disconnect unit E and each fire extinguisher 15, 16 are controlled by a single actuator mounted at a convenient point remote from the battery and extinguishers, preferably being mounted on the dashboard F of the vehicle, and being accessible to the vehicle operator within the passenger compartment. This control unit includes a housing or support 30 suitably secured to the dash, there being a shaft 31 rotatably and reciprocably mounted in the housing and support and having a handle 32 affixed thereto within the passenger compartment. The opposite end of the shaft has a cable 33 secured thereto in any suitable manner, as by means of a screw 34, which is slidable through a cable housing 35, with the opposite end of the cable 33 secured to the pull pin 14 of the battery disconnect unit. By pulling on the cable 33, the pull pin is removed from the battery disconnect unit E, thereby allowing a spring or the like (not shown), forming part of the unit E, to disconnect normally contacting current transmitting members forming part of the unit, as described in the above-identified application Ser. No. 688,456.

Secured to the shaft 31 within the housing 30 is a winding drum 36, which is rotatable in both directions by turning of the handle 32 and the shaft 31, as a result of effecting a spline connection between the drum and shaft. Thus, a key 37 is secured to the shaft 31 and is slidable within a keyway 38 provided in the hub portion of the drum. The key and keyway connection 37, 38 permits rotation of the shaft 31 in either direction to correspondingly rotate the drum 36, while it also permits the shaft 31 to slide axially of the drum. The drum has a plurality, such as a pair, of peripheral grooves 39, 40 formed therein, the end of a cable 41 being disposed in one of the grooves 39 and fastened to the drum in any suitable manner, as by means of a screw 42, a second cable 43 having its end portion disposed in the other groove 40 and secured to the drum 36, as through use of a screw 44 or the like. The cables 41, 43 extend from the drum in opposite directions, each one of them passing through a guide 45 which may be suitably affixed or integral with the upper wall 46 of the housing or support.

One of the cables 41 secured to the winding drum extends through a cable housing 47 and is secured to the operating lever 21 of one of the fire extinguishers 15. The other cable 43 extends through its associated cable housing 48, and is secured to the operating lever 21 of the other fire extinguisher 16. A suitable fixed member 50 extends from each valve 19 of a fire extinguisher and has a collar 51 mounted on its outer end, which is suitably secured to the end portion of a cable housing 47 or 48. A helical compression spring 52 extends between the collar 51 and the outer end of the lever 21, urging the lever in a direction outwardly of the extinguisher, in which the extinguisher valve 19 will be closed. Each cable 41, 43 is suitably secured to the outer end of an associated valve operating lever 21 and is adapted to be pulled within its cable housing 47, 48 to shift the lever 21 inwardly and thereby open the valve 19 of the fire extinguisher, permitting the fire extinguishing fluid to discharge from the extinguisher into the region to be flooded with the extinguisher fluid.

As explained above, a straight pull taken on the handle 32 will effect disconnection of the battery disconnect unit E. Rotation of the handle 32 in one direction, as in a clockwise direction illustrated in FIGS. 2 and 4, will exert a pull on the cable 41 leading to the valve 19 of the fire extinguisher 15 under the hood of the vehicle and will cause such extinguisher to function. On the other hand, rotation of the handle in the opposite or counterclockwise direction will rotate the drum 36 in the opposite direction, exerting a pull on the other cable 43 running to the fire extinguisher 16 and its valve mechanism in the region of the gasoline or fuel tank, opening the fire extinguisher valve 19 and allowing the fire fighting foam or the like to discharge through the perforations 18 in the region of the fuel tank, to extinguish the fire in such region, or to prevent such fire from commencing.

When the drum 36 is rotated back to its initial position, the cable on which a pull was exerted will be shifted by the valve closing spring 52 back to its initial position, and will correspondingly return the lever 21 to its location permitting the valve 19 to close, thereby shutting off the discharge of fire fighting fluid from the extinguisher.

It is, accordingly, apparent that a system has been provided in which a single control can be operated very quickly for selectively actuating the battery disconnect unit E, the fire extinguisher 15 at one location, such as under the hood, and the fire extinguisher 16 at another location, as in the region of the gas tank. The battery disconnect unit and one of the fire extinguishers can be actuated simultaneously, if desired, by exerting a pull on the handle while rotating it in one direction at the same time.

We claim:

1. In apparatus for preventing or extinguishing fire in a motor vehicle having a battery: a battery disconnect unit; a first fire extinguishing apparatus located in a first desired location on the vehicle; first control means for disconnecting said unit; second control means for effecting operation of said fire extinguishing apparatus; and a single actuating mechanism connected to said first and second control means and operable to actuate said first and second control means; wherein said single actuating mechanism comprises a reciprocable and rotatable shaft connected to said first control means, and a drum secured to said shaft and connected to said second control means, whereby longitudinal movement of said shaft disconnects said battery disconnect unit and rotation of said shaft rotates said drum to effect operation of said fire extinguishing apparatus.

2. In apparatus for preventing or extinguishing fire in a motor vehicle having a battery: a battery disconnect unit; a first fire extinguishing apparatus located in a first desired location on the vehicle; first control means for disconnecting said unit; second control means for effecting operation of said fire extinguishing apparatus; and a single actuating mechanism connected to said first and second control means and operable to actuate said first and second control means; wherein said first control means comprises a first cable connected to said disconnect unit, said second control means comprises a second cable connected to said fire extinguishing apparatus, said actuating mechanism comprising a reciprocable and rotatable shaft connected to said first cable and a drum on said shaft connected to said second cable.

3. In apparatus as defined in claim 1; said battery being located adjacent the engine of the vehicle, said actuating mechanism being located on the dashboard of the vehicle.

4. In apparatus as defined in claim 2; said battery and fire extinguishing apparatus being located adjacent the engine of the vehicle, said actuating mechanism being located on the dashboard of the vehicle.

5. In apparatus for preventing or extinguishing fire in a motor vehicle having a battery: a battery disconnect unit; a first fire extinguishing apparatus located in a first desired location on the vehicle; first control means for disconnecting said unit; second control means for effecting operation of said fire extinguishing apparatus; and a single actuating mechanism connected to said first and second control means and operable to actuate said first and second control means; a second fire extinguishing apparatus located in a second desired location on the vehicle; third control means for effecting operation of said second fire extinguishing apparatus; said single actuating mechanism being connected to said third control means and operable to actuate said third control means; said single actuating mechanism comprising a reciprocable and rotatable shaft connected to said first control means, and a drum secured to said shaft and connected to said second and third control means, whereby longitudinal movement of said shaft disconnects said battery disconnect unit, rotation of said shaft in one direction rotates said drum to effect operation of said second fire extinguishing apparatus, rotation of said shaft in the opposite direction rotating said drum to effect operation of said first fire extinguishing apparatus.

6. In apparatus for preventing or extinguishing fire in a motor vehicle having a battery: a battery disconnect unit; a first fire extinguishing apparatus located in a first desired location on the vehicle; first control means for disconnecting said unit; second control means for effecting operation of said fire extinguishing apparatus; and a single actuating mechanism connected to said first and second control means and operable to actuate said first and second control means; a second fire extinguishing apparatus located in a second desired location on the vehicle; third control means for effecting operation of said second fire extinguishing apparatus; said single actuating mechanism being connected to said third control means and operable to actuate said third control means; said first control means comprising a first cable connected to said disconnect unit, said second control means comprising a second cable connected to said first fire extinguishing apparatus, said third control means comprising a third cable connected to said second fire extinguishing apparatus, said actuating mechanism comprising a reciprocable and rotatable shaft connected to said first cable and a drum on said shaft connected to said second and third cables.

7. In apparatus as defined in claim 6; wherein said battery and first fire extinguishing apparatus are located adjacent the engine of the vehicle, said second fire extinguishing apparatus being located adjacent the fuel tank of the vehicle, said actuating mechanism being located on the dashboard of the vehicle.

References Cited
UNITED STATES PATENTS

| | | | |
|---|---|---|---|
| 1,737,511 | 11/1929 | Mitchell | 194—63 |
| 2,015,995 | 10/1935 | Egtvedt. | |
| 2,511,959 | 6/1950 | Williams. | |

SAMUEL F. COLEMAN, Primary Examiner